US012686774B2

(12) United States Patent
Wilson et al.

(10) Patent No.: US 12,686,774 B2
(45) Date of Patent: Jul. 21, 2026

(54) COMPOSITE THERMAL SPRAY POWDER OF OXIDES AND NON-OXIDES

(71) Applicant: Oerlikon Metco (US) Inc., Westbury, NY (US)

(72) Inventors: Scott Wilson, Zürich (CH); Gregory Szyndelman, Villigen (CH); Alexander Barth, Constance (DE); Hwasoo Lee, Hicksville, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 18/261,003

(22) PCT Filed: Jan. 11, 2022

(86) PCT No.: PCT/US2022/011982
§ 371 (c)(1),
(2) Date: Jul. 11, 2023

(87) PCT Pub. No.: WO2022/155134
PCT Pub. Date: Jul. 21, 2022

(65) Prior Publication Data
US 2024/0059904 A1 Feb. 22, 2024

Related U.S. Application Data

(60) Provisional application No. 63/136,413, filed on Jan. 12, 2021.

(51) Int. Cl.
*C09D 5/03* (2006.01)
*C09D 1/00* (2006.01)
(Continued)

(52) U.S. Cl.
CPC ............... *C09D 5/031* (2013.01); *C09D 1/00* (2013.01); *C23C 4/11* (2016.01); *F01D 5/288* (2013.01);
(Continued)

(58) Field of Classification Search
None
See application file for complete search history.

(56) References Cited

U.S. PATENT DOCUMENTS

2010/0028549 A1* 2/2010 Schlichting ......... C23C 28/3455
427/454
2011/0086163 A1* 4/2011 Ma ........................... C23C 4/12
428/463
(Continued)

FOREIGN PATENT DOCUMENTS

CN 112063952 A 12/2020
WO WO-2020142125 A2 * 7/2020 ........... C04B 35/486

OTHER PUBLICATIONS

International Search Report issued in Application No. PCT/US2022/011982 dated Mar. 30, 2022.
(Continued)

*Primary Examiner* — Jose I Hernandez-Kenney
(74) *Attorney, Agent, or Firm* — Chrisman Gallo Tochtrop LLC

(57) ABSTRACT

Composite thermal spray powders are formed by manufacturing two or more powder feedstock components having different chemical compositions, particle size ranges and morphologies, these different features arising from different powder manufacturing processes. The resulting coatings typically serve as abradable seals, thermal barrier coatings or environmental barrier coatings, have improved temperature resistance, and maintain favorable properties over a longer time span compared to current coating materials. The thermal spray coating may be formed by using the described
(Continued)

composite powders consisting of two or more powder components having at least one of different powder fractions in particle size, morphology and/or chemical composition or by co-spraying the described single components with at least different morphologies such as agglomerated, agglomerated-and-sintered, cladded, fused-and-crushed, or hollow oven spherical powder.

21 Claims, 6 Drawing Sheets

(51) Int. Cl.

| | |
|---|---|
| *C23C 4/11* | (2016.01) |
| *F01D 5/28* | (2006.01) |
| *F01D 11/12* | (2006.01) |

(52) U.S. Cl.
CPC ........ *F01D 11/12* (2013.01); *F05D 2300/611* (2013.01)

(56) References Cited

U.S. PATENT DOCUMENTS

| | | | |
|---|---|---|---|
| 2012/0295825 A1* | 11/2012 | Dorfman | ............. C22C 32/0068 |
| | | | 508/151 |
| 2017/0260101 A1 | 9/2017 | Torigoe et al. | |
| 2019/0093497 A1* | 3/2019 | Ndamka | ............. C04B 41/5024 |
| 2021/0130243 A1 | 5/2021 | Wilson | |

OTHER PUBLICATIONS

Written Opinion issued in Application No. PCT/US2022/011982 dated Mar. 30, 2022.

\* cited by examiner

Agglomerated + Fused & crushed

Unmolten          Thick splat from F&C

Agglomerated + HOSP

*Thin splat from HOSP*    *Debris*

Figure 3

Agglomerated + Agglomerated & sintered

Agglomerated + Mechanical or chemical cladded

COMPOSITE THERMAL SPRAY POWDER OF OXIDES AND NON-OXIDES

CROSS-REFERENCE TO RELATED APPLICATION

This application claims the benefit and priority of U.S. Provisional Application No. 63/136,413 filed Jan. 12, 2021, the disclosure of which is expressly incorporated by reference herein in its entirety.

BACKGROUND

1. Field of the Disclosure

Example embodiments relate to the use of multiple powder fractions dissimilar in particle size range, morphologies and chemical compositions arising from several powder manufacturing methods. In particular, example embodiments relate to the thermal spraying of homogenized powder fractions having chemistries suitable for the application of coatings exhibiting functionalities that can range from thermal barrier protection and/or environmental barrier protection and/or clearance control.

2. Background Information

Coating morphology and chemical composition are relevant factors in thermal spray coating applications and are related to the starting characteristics of the powder feedstock such its morphology, particle size distribution and chemistry. The relationship between the above mentioned powder characteristics and the resulting coating properties are used to design thermal spray coatings suitable for specific functionalities such as thermal barrier protection, environmental barrier protection as well as clearance control (abradable) coatings in turbomachinery. In the instance of thermally sprayed abradable coatings, these are widely used as a clearance control technology in aero-engines as well as in gas and steam turbines, e.g. as seals preventing undesired backstream of gas between engine blade tips and the surrounding turbine casing. The use of sacrificial abradable coatings for aero and stationary gas turbines is a means to increase engine efficiency through reduction of the tip clearance between rotor and stator components. Not only does a properly designed abradable coating clearance control system increase engine efficiency, it also increases safety margins by allowing rotating components to rub against a surface that will cause little or no component damage in the event of an incursion. In addition to the sealing function of thermally sprayed abradables, these coatings can also offer additional functionalities such as thermal barrier and/or environmental barrier protection which allows stator components to survive in high temperature environments, by reducing the thermal flux into the components (example of thermal barrier coatings) or by sealing the substrate from the surrounding atmosphere (in the case of environmental barrier coatings).

SUMMARY

Example embodiments related to coatings applied by thermal spray methods that present functionalities of thermal protection and/or environmental protection and/or clearance control in high temperature environments, wherein the base material of the coating includes a plurality of ceramic powders of different compositions and/or particle size fractions and/or morphologies arising from different powder manufacturing methods. Abradable coatings applied into the shroud sections of aero-engines and land-based turbines help seal the clearance between rotating blades/fins and the surrounding engine stator structure. Sealing the clearance contributes to minimizing the leakage gap by sacrificing the abradable coating in order to protect the blade, and as a result to increase the engine efficiency and life span. Higher operating temperatures for gas turbine engines are continuously sought in order to increase efficiency. However, as the operating temperatures increase, the high temperature durability of the components of the engine must correspondingly increase as well. At such high temperatures, ceramic-based thermal spray abradable coatings are prone to sintering, which leads to an increase in hardness above an unacceptable level for which damage of the blades is more likely to occur in the case of rub event. The disclosed invention describes the use of multiple powder fractions dissimilar in particle size range and morphologies arising from several powder manufacturing methods and compositions. The suggested combination of dissimilar particle morphologies and size ranges was found to produce coatings that exhibit good abradability, adequate resistance to solid particle erosion and excellent resistance to sintering with no or limited age-hardening.

Thermal barrier coatings (TBCs) are applied on components such as combustors, high-pressure turbine blades, vanes, shrouds, and the like. Applying TBCs allow to increase the operating temperature of hot gas path components which can result in higher energy output and improved engine efficiencies. The thermal insulation provided by TBCs enables components coated by a TBC to survive at higher operating temperatures, increases component durability and improves engine reliability. Significant advances in high temperature capabilities have been achieved, and conventional yttria-stabilized zirconia (YSZ) may be used for thermal insulation in TBC systems. Coatings with 6 to 8 weight percent yttria added to zirconia provide desired thermal shock resistance, due to toughening mechanisms at the leading edge of a growing crack as a result of tetragonal to monoclinic phase transformation under stress, where key advantage of YSZ is also more elastically compliant which led to low Young's (E) modulus. Increased use of rare-earth elements up to 90 weight percent for rare-earth stabilized zirconia coatings can lead to a reduction in thermal conductivity and can avoid coating phase transformation, the coating being fully stabilized in its cubic form. The powder materials that are processed by thermal spray technology to form a coating are produced with a variety of methods. The goal in producing such powder materials is to obtain good flowability, low or no deviations in composition, reproducibility, and ease of manufacturing. The resulting morphology of powders differs depending on the manufacturing process used to manufacture the powders, and thereby the coating microstructure and properties of the resulting coating differs. Various types of powders may be used. For example, agglomerated (Aggl.), agglomerated-and-sintered (A&S), hollow oven spherical powder (HOSP), chemically or physically cladded (Clad) and fused-and-crushed (F&C) powders are typical powder manufacturing steps that lead to unique particle morphologies. The use of multiple powder fractions dissimilar in particle size range and morphologies arising from these different powder manufacturing methods was found to produce coatings with unique properties.

When using fused-and-crushed powder architectures, denser coating structures can be achieved which can result in increased adhesion strength and Young's modulus, thereby improving the coating resistance to solid particle erosion. Agglomerated-and-sintered powders are produced from fine primary particles, allowing better control of the chemical composition and of the cohesion of individual particles. Agglomerated-and-sintered powders are used to provide a desired balance of porosity and erosion resistance, as well as an efficient deposition efficiency. Large agglomerates are embedded in coatings made from agglomerated-and-sintered powders, which produce to increased porosity needed for lower thermal conductivity applications. Agglomerated particles with coarse particle sizes are used to generate large porosity in the microstructure from the spraying process, leaving particles unmolten, but the combination of coarse particle size and easy break-up of the powder tends to lower the spraying deposition efficiency. Benefits of having agglomerate powder as feedstock include the coating microstructure breaking up with less energy from cutting due to looser bonding between the particles. However this may have a negative impact on the coating's erosion resistance. Clad powders may be prepared by known mechanical and/or chemical cladding processes. The powdered material may be only a flux material to facilitate binding, or for embodiments where a functional layer of cladding material is desired, the powdered material may contain powder, either as a separate layer placed under a layer of powdered flux material, or mixed with the powdered flux material, or combined with the flux material into composite particles, such that the melting forms the layer of cladding material on the surface. Accordingly, optimizing the cladding structures may produce coatings that have greater durability and provide excellent thermal insulation over a long period of service time by having gaps between the columns and nodules that are randomly distributed in the microstructure.

Example embodiments relate to powders with bimodal distributions in particle size combined with two or more powder morphologies in order to create coatings with a better balance of hardness, thermal fatigue resistance, thermal shock resistance, erosion resistance, and sintering resistance and allow good abradability performance throughout the full lifetime of the turbine component. The resultant product may include more than one powder or component or morphology, also referred to herein as a component. A primary component may be a matrix former, and a secondary component or components may be a porosity former or structure hardener added to customize and optimize the resulting coating for a given application.

Ceramic abradable coatings provide advantages in improving the cutting performance of high temperature sections in turbine engines. Ceramics are advantageous due to their resistance to high temperatures reaching above 1000° C., but the generally higher hardness of these materials may also lead to wear damage on, e.g., the nickel superalloy-based turbine blades (turbine section of aerospace engines or gas). Composite powders of the disclosed invention use different particle morphologies arising from different manufacturing technologies which may improve the coating properties with respect to abradability, and these properties may be maintained over the service life of the coating. In addition to the composite powder, intensive mixing of a dislocator or fugitive phase selected from the group consisting of polymers (e.g. polyester, PMMA, polyimides, . . . ), solid lubricants (e.g. hexagonal boron nitride, Calcium fluoride, Graphite, . . . ) and/or alternative filler phases (e.g. clays, magnesium silicates, Aluminum silicates, . . . ) may further improve the coating properties with respect to abradability by providing necessary porosity in the coating matrix.

Severe wear damage may arise from inefficient cutting processes, leading to excessive friction-heating of blade materials under severe rubbing contact conditions in a turbine and/or if the thermally sprayed abradable coating is too hard. Examples of damage mechanisms to the blades include bulk plastic deformation and fracture, oxidation of material arising from frictional heating, and cracking of the material due to extreme cutting forces.

Thermal barrier coatings (TBCs) may improve the thermal insulation and erosion resistance properties of a coated component, and may maintain these properties over the service life of the component by reducing sintering due to the use of ceramics containing composite powders. The composite powders of the invention differ in particle morphology due to different powder manufacturing routes, and that differ in chemical compositions and/or particle size distributions. As an example, turbine blades and other parts of turbine engines may be comprised of thermal barrier coated nickel-based superalloys because they need to maintain their integrity at operating temperatures of at least 1000° C. to 1150° C. Thermal barrier coatings provide greater resistance to corrosion and oxidation in these high temperature environments in combination with MCrAlY bond coats, as compared to the underlying alloys themselves.

Environmental barrier coatings (EBCs) improve the protection of engine components from the effects of environmental threats such as, e.g., hot gas, water vapor, and oxygen. For example, the engine components may be manufactured from ceramic matrix composites, where the EBC may be applied to gas turbine components constructed from a ceramic matrix composite (CMC) such as a SiC—SiC composite.

Example embodiments include an improved thermal spray powder useful for clearance control applications in gas turbine engines, and to allow engine components to survive in high temperature environments such as, e.g., the hostile thermal environment of gas turbine engines (i.e., 1000° C. or more). Example embodiments include a powder material for producing coatings to be applied by thermal spray, the powder material having improved mechanical properties, such as abradability, adhesion strength, and Young's modulus, as well as thermal properties such as thermal conductivity, thermal shock, and sinter resistance. Example embodiments provide these properties together with high deposition efficiencies, which may require maintaining a balance of porosity level, hardness and resulting erosion resistance.

Example embodiments provide an improved powder generated via the homogenization of two or more powder components having different particle morphologies due to different manufacturing methods. In addition, each of the components may vary in particle size distribution and in chemical composition. For example, the ceramic compositions e.g. various types of aluminum oxide ($Al_2O_3$), barium strontium aluminosilicate (BSAS; 1-x$BaO$-x$SrO$-$Al_2O_3$-2$SiO_2$), calcium oxide ($CaO$), hafnium oxide ($HfO_2$), high entropy oxides (HEOs), magnesium oxide ($MgO$), aluminosilicate or mullite ($Al_2O_3$—$SiO_2$), silicon oxide ($SiO_2$-x) and zirconium oxide ($ZrO_2$) of any single component may include a rare-earth (RE) oxide content in the range of greater than 0 (>0) weight percent to 90 weight percent. The REs represent oxides of Ce, Dy, Er, Eu, Gd, Hf, Ho, La, Nd, Lu, Pm, Pr, Sc, Sm, Tb, Tm, Y, Yb or their combinations.

High entropy oxides (HEOs) are oxides with a high configurational entropy, S(config). They typically contain five or more different metal cation types as well as oxygen, to form one or more oxide sublattices. International Publication No. WO2020/142125A2 to He et al., the disclosure of which is incorporated by reference herein in its entirety, discloses the compositions of high entropy oxides (HEOs). At least five of the different oxide-forming metallic cations include: a) at least one of the transition metals: Sc, Y, Ti, Zr, V, Nb, Ta, Cr, Mo, W, Mn, Re, Fe, Ru, Co, Ni, Cu, or Zn, and/or at least one of the lanthanides La, Ce, Pr, Nd, Pm, Sm, Eu, Gd, Tb, Dy, Ho, Er, Yb, or Lu. One of the at least five different oxide-forming metallic cations may also comprise at least one of the alkaline-earth metals: Be, Mg, Ca, Sr, or Ba. High entropy is defined by having 3, 4, or 5 or more principal elements, and the content of the principal elements may be between 5 weight percent to 35 weight percent.

Each component may have different morphologies such as e.g. cylindrical, flakey, irregular, plate-like, spherical, or spherical hollow with porous or dense structure, resulting from various manufacturing methods such as e.g. agglomerated, agglomerated-and-sintered, chemically or physically cladded, fused and crushed, and/or hollow oxide spherical powder (HOSP). Methods according to example embodiments include providing these components in a form that allows limited or no inclusion of polymeric binder for optimum coatings, and forming a resulting a powder for producing thermally sprayed coatings having properties such as hardness, porosity level and erosion resistance that are maintained even after exposure to high temperatures of 1000° C. or higher.

Example embodiments improve the functionality of component-based thermal spray coatings for higher operating temperature applications, e.g., in a range of 1000° C. or higher, by using intensive mixing or co-spraying a plurality of powders. As an example, abradable seals are used in turbo-machinery to reduce the clearance between the rotor and the stator components. Reducing the clearance may improve the efficiency of a turbine engine and reduce fuel consumption by reducing or eliminating the possibility of a catastrophic blade/engine case contact rub. The clearance control seal is produced by applying an abradable coating to the stationary part of the engine with the rotating part rubbing against an abradable coating.

Example embodiments include a composition, a powder architecture and a powder manufacturing method to develop a new generation of ceramic materials for high temperature applications and improved coating performance compared to powder materials that contain a single type of morphology. As an example of applications, minimum temperature and functional stability required for new generation of engines in the aerospace industry is in the range of 1000° C. or higher.

Example embodiments include ceramic-based thermal spray powders to produce abradable coatings for clearance control applications where a rotating component in an engine may come into contact with the coating as a result of design intent or operational requirements. These coatings are designed to minimize the wear to the rotating component while maximizing gas path efficiency by providing clearance control in seal areas. Such a coating combines the desired properties of soft and sinter-resistant materials via manufacturing of an agglomerated powder component combined with a fused-and-crushed powder component having high rare-earth oxide content in the matrix. Another example of the coating could combines an agglomerated powder component with an agglomerated-and-sintered powder component exhibiting a coating structure that presents the right balance between key functionalities such as its cutting performance, its temperature resistance and its erosion resistance.

Embodiments are directed to method of making a thermal spray powder. The method includes preparing a plurality of powders, each powder having at least one of different compositional ratios or different morphologies; and combining two or more of the plurality of powders to form a composite powder.

In embodiments, the combined two or more of the plurality of powders can include a material selected from the group consisting of at least one principal component and a combination of one or more secondary components. The two or more of the plurality of powders, which have at least different particle ranges or different chemical compositions, are intensively mixed with a dislocator or fugitive phase selected from the group consisting of but not limited to polymer, boron nitride, bentonite, talc, calcium fluoride or graphite. Further, the combined two or more of the plurality of powders further comprises at least one dislocator or fugitive phase selected from the group consisting of a polyester, boron nitride or graphite.

According to embodiments, at least one of the two or more of the plurality of powders comprises at least one ceramic composite selected from the group consisting of aluminum oxide, barium strontium aluminosilicate, calcium oxide, hafnium oxide, high entropy oxide, magnesium oxide, mullite, silicon oxide and zirconium oxide. Further, the high entropy oxide can include a matrix having at least three principal elements each constituting between 5 weight percent and 35 weight percent of the matrix. The at least one ceramic may include rare-earth oxides selected from the group consisting of Ce, Dy, Er, Eu, Gd, Hf, Ho, La, Nd, Lu, Pm, Pr, Sc, Sm, Tb, Tm, Y, Yb, and mixtures thereof. Further, the at least one ceramic composite consists of particles between 10 μm to 180 μm.

In other embodiments, the thermal spray can include a powder porosity in a range of about 1% to about 90%.

In embodiments, the two or more of the plurality of powders have at least one of different particle ranges, different morphologies or different chemical compositions, and the combining comprises intensively mixing the two or more of the plurality of powder with a dislocator or fugitive phase selected from the group consisting of polymer, boron nitride, bentonite, talc, calcium fluoride or graphite.

Embodiments are directed to a method of forming an abradable coating layer. The method includes at least one of: thermal spraying a mixture of a plurality of powders or co-spraying the plurality of powders to form the abradable coating layer on a substrate, at a temperature sufficient to partially melt particles of the powder feedstock during thermal spraying; and cooling the abradable coating layer to room temperature, the abradable layer being substantially free of any cracks. The plurality of powders comprise two powders having different morphologies.

According to embodiments, the thermal spraying may include at least one selected from the group consisting of air plasma spraying, high velocity oxyfuel or combustion spraying.

In still yet other embodiments, the plurality of powders have at least one of different particle ranges or different chemical compositions.

Embodiments are directed to a method of forming an abradable coating. The method includes thermal spraying a powder-based coating on a substrate, wherein the thermal-sprayed coating has a thickness between about 5 μm and 8,000 μm, and the powder includes a rare-earth element constituting from greater than 0 weight percent to 90 weight percent of the thermal-sprayed coating.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 3 illustrates a coating microstructure comprising agglomerated particles and HOSP particles, according to the mentioned example embodiments;

DETAILED DESCRIPTION

Through one or more of its various aspects, embodiments and/or specific features of the present disclosure are intended to bring out one or more of the advantages as defined in the invention description section.

In example embodiments, the powder for thermal spray may have a size between 5 μm and 180 μm, with each powder particle consisting essentially of i) greater than 0 (>0) weight percent to 90 weight percent of Yttria (or other specified rare-earth oxides) and the balance of zirconia, ii) >0 weight percent to 90 weight percent Ytterbia (or other specified rare-earth oxides) and the balance of silicate, or iii) a high entropy oxide matrix including at least three principal oxides each including between 5 weight percent and 35 weight percent of the matrix, as well as incidental impurities (less than 1%).

In example embodiments, powder particles consisting essentially of certain rare-earth oxides can be substituted for the above Yttria or Ytterbia powder particles. In such powder particles, the rare-earth oxides may be in an amount of >0 weight percent to 90 weight percent. The rare-earth oxides may include Ce, Dy, Er, Eu, Gd, Hf, Ho, La, Nd, Lu, Pm, Pr, Sc, Sm, Tb, Tm, Y, and Yb and any combinations thereof.

In embodiments, a plurality of powders may be utilized, and each of the powders may have different morphologies resulting from various manufacturing methods such as cylindrical, flakey, irregular, plate-like, spherical, spherical hollow with porous or dense structure resulting from various manufacturing methods for instance agglomerated, agglomerated-and-sintered, chemically or physically cladded, fused and crushed, and hollow oxide spherical powder.

Figure 1:
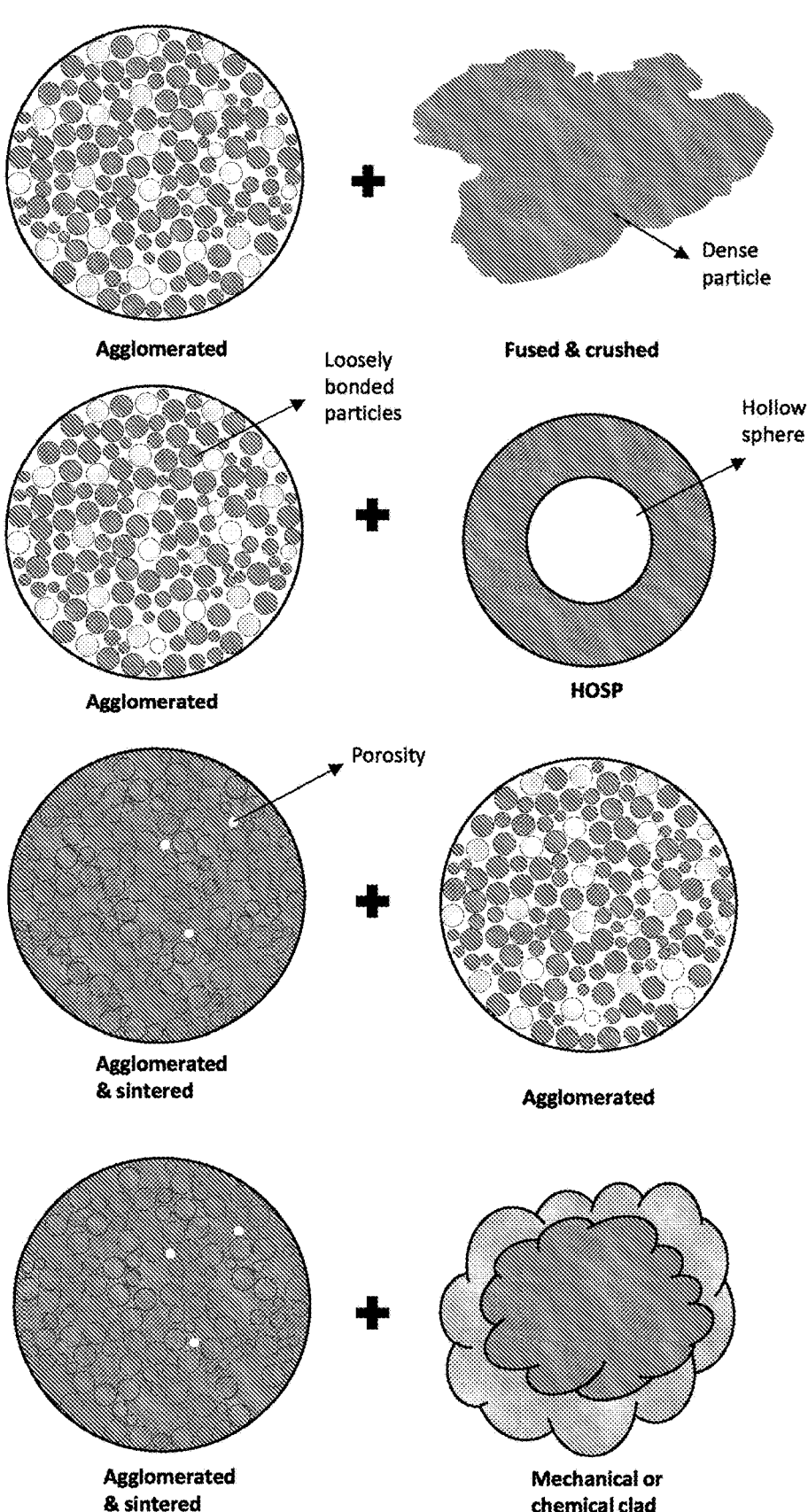
FIG. 1 illustrates combination of powders having dissimilar morphologies arising from several manufacturing methods, according to the mentioned example embodiments.

FIG. 1 illustrates powders blended with various other types of powders, according to various example embodiments. In FIG. 1, several types of component combinations are illustrated. As a first example, a first component may be agglomerated particles manufactured with a second component, which are fused and crushed (F&C) particles. A second example includes a first component of agglomerated particles with a second component of a hollow oxide spherical particles (HOSP). A third example includes a first component of agglomerated-and-sintered (A&S) particles and a second component of agglomerated particles. The fourth example includes a first component of agglomerated-and-sintered (A&S) particles and a second component of mechanical or chemical cladded particles. Of course, the above combinations are merely exemplary and other combinations of agglomerated, F&C, HOSP, A&S and mechanical or chemical cladded particles can be contemplated as a first component with any other of agglomerated, F&C, HOSP, A&S and mechanical or chemical cladded particles as a second component without departing from the spirit and scope of the embodiments.

Figure 2:
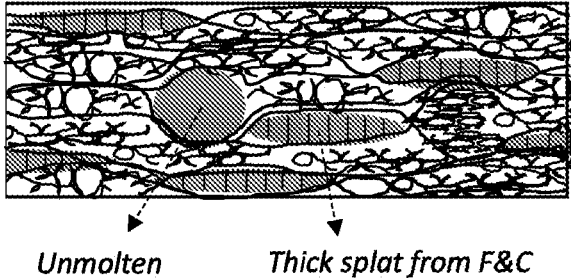
FIG. 2 illustrates a coating microstructure comprising agglomerated particles and fused-and-crushed particles, according to the mentioned example embodiments.

FIG. 2 illustrates a coating structure consisting of agglomerated particles combined with fused-and-crushed particles, according to various example embodiments. Fused-and-crushed particles are formed from a fused solid mass, which is then crushed to the appropriate size. Fusion and crushing techniques produce powders that are consistent in size, shape, chemistry and toughness. In example embodiments, the composite powder includes a first component consisting of agglomerated particles and a second component made of F&C particles. In the example embodiment illustrated in FIG. 2, some of the particles remain unmolten and the shapes of the resulting particles vary due to local stresses but include an amount of thick splats resulting from the F&C powder formation process.

Figure 3:
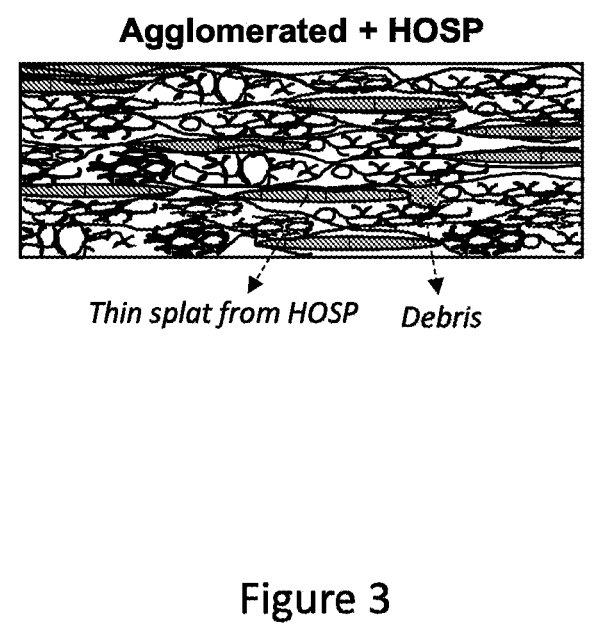

FIG. 3 illustrates a coating structure consisting of agglomerated particles and HOSP particles, according to various example embodiments. In example embodiments, the composite powder mixture includes a first component of agglomerated particles and a second component of HOSP particles. In this example, the HOSP component can be considered as a porosity former while the agglomerated component acts as a matrix.

Figure 4:
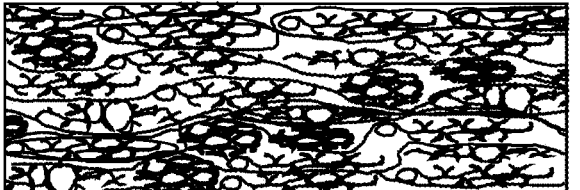
FIG. 4 illustrates a coating microstructure comprising agglomerated particles and agglomerated-and-sintered particles, according to the mentioned example embodiments.

FIG. 4 illustrates a coating structure consisting of agglomerated particles and agglomerated-and-sintered particles, according to various example embodiments. In example embodiments, the composite powder includes a first component of agglomerated particles and a second component of A&S particles. In this example, the A&S component can be considered as a porosity former while the agglomerated component acts as a matrix.

Figure 5:
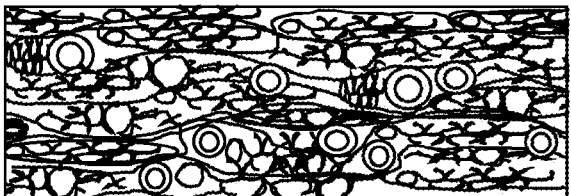
FIG. 5 illustrates a coating microstructure comprising agglomerated particles and mechanical or chemically cladded particles, according to the mentioned example embodiments.

FIG. 5 illustrates a coating structure consisting of agglomerated particles and mechanical or chemically cladded particles, according to various example embodiments. In example embodiments, the composite powder includes a first component of agglomerated particles and a second component of mechanical or chemically cladded particles. In this example, the mechanical or chemically cladded component can be considered as a porosity former while the agglomerated component acts as a matrix.

Table 1 below includes examples of possible combinations in an embodiment comprising two or more components:

TABLE 1

| Component 1 | | Component 2 | |
| --- | --- | --- | --- |
| Morphology | Ratio (wt. %) | Morphology | Ratio (wt. %) |
| Agglomerated | 90-50 | A & S | 10-50 |
| Agglomerated | 90-50 | Clad | 10-50 |
| Agglomerated | 90-50 | F & C | 10-50 |
| Agglomerated | 90-50 | HOSP | 10-50 |
| A & S | 90-50 | Agglomerated | 10-50 |
| A & S | 90-50 | Clad | 10-50 |
| A & S | 90-50 | F & C | 10-50 |
| A & S | 90-50 | HOSC | 10-50 |
| Clad | 90-50 | Agglomerated | 10-50 |
| Clad | 90-50 | A & S | 10-50 |
| Clad | 90-50 | F & C | 10-50 |
| Clad | 90-50 | HOSP | 10-50 |
| F & C | 90-50 | A & S | 10-50 |
| F & C | 90-50 | Agglomerated | 10-50 |
| F & C | 90-50 | Clad | 10-50 |
| F & C | 90-50 | HOSP | 10-50 |
| HOSP | 90-50 | Agglomerated | 10-50 |
| HOSP | 90-50 | A & S | 10-50 |
| HOSP | 90-50 | Clad | 10-50 |
| HOSP | 90-50 | F & C | 10-50 |

Table 2 below discloses typical powder chemistries of interest according to the example embodiments: The rare earth oxides (RE) represent oxides of Ce, Dy, Er, Eu, Gd, Hf, Ho, La, Nd, Lu, Pm, Pr, Sc, Sm, Tb, Tm, Y, Yb or their combinations.

TABLE 2

| Chemistry for Components | Ratio of RE (wt. % ) |
| --- | --- |
| $(RE)Al_2O_3$ | >0-90 |
| (RE)BSAS | >0-90 |
| (RE)CaO | >0-90 |
| (RE)HEO | >0-90 |
| (RE)HfO | >0-90 |
| (RE)MgO | >0-90 |
| (RE)Mullite | >0-90 |
| $(RE)SiO_x$ | >0-90 |
| $(RE)ZrO_2$ | >0-90 |

In example embodiments, a method of producing spray-dried agglomerated powder includes preparing fine particles (average particle size of less than about 10 μm) of alumina, BSAS, CaO, hafnia, HEOs, MgO, mullite, silica and/or zirconia, by mixing the fine particles in water with organic binders and suspension agents to form a slurry. The slurry may then be spray-dried to create agglomerated particles that can then be applied using various thermal spray techniques to coat an engine part. The agglomerates may not be substantially friable so as not to break down during blending, handling and/or feeding of the particles. In example embodiments, agglomerates having a spherical shape present a low surface area, which reduces friction, improves flowability and reduces viscosity when combining with other powder feedstock components having different morphologies.

Using separate alumina, BSAS, CaO, hafnia, HEOs, MgO, mullite, silica and/or zirconia raw materials may result in a chemical inhomogeneity of the powder particles. In order to achieve phase stability, the final coating may include an alloy of separate alumina, BSAS, CaO, hafnia, HEOs, MgO, mullite, silica and/or zirconia. In the case of spray-dry powders, the alloying may take place during the powder manufacturing process or during the thermal spraying process. The need to alloy the powder during thermal spraying can be reduced or eliminated by performing the alloying step prior to thermal spraying. Conventional techniques rely upon plasma densification or sintering of the spray-dried powder. The sintering step hardens and strengthens the powder when individual primary particles grow into each other to form an interconnected network. The interconnectivity of the resulting sintered body results in increased density and cohesive strength. Agglomerated powder particles, and agglomerated-and-sintered powder particles, are usually of a substantially spherical shape and possess a finely distributed inner-particle porosity.

In example embodiments, spray-dried powder manufactured from starting materials of pre-alloyed alumina, BSAS, CaO, hafnia, HEOs, MgO, mullite, silica and/or zirconia produces a substantially homogeneous powder in spite of variations that may occur during the manufacturing of slurries or during the spray-drying manufacturing step and even when a wide particle size distribution is used as the starting material to prepare the powders. In example embodiments, the powder may not have to be alloyed before or during thermal spraying. One such plasma densified powder is currently available as HOSP. Such pre-processing eliminates the variations in the alloying caused by inconsistent treatment of the particles during the thermal spray process. The pre-processing may also result in a more structurally stable powder that reduces powder breakdown prior to thermal spraying that could prevent the proper alloying of the powder during spraying. In addition, the particles are transformed into hollow spheres generating large pores in the resulting coating structure.

As an alternative to spray-dried and pre-processed powders, fused-and-crushed powders have been used in the area of thermal spray for TBC applications. For example, individual yttria and zirconia powders are mixed and fused, using an induction arc or other process, to produce a briquette of fused material. The briquette is then crushed to produce a powder of the desired size suitable for thermal spraying, generally between 11 μm and 150 μm. F&C powders may exhibit angular and irregular morphologies. As a result, the use of these powders may result in inconsistent powder feeding. In addition, the powder particles are generally denser and harder to melt, which results in lower deposition efficiencies due to insufficient heating of the particles in the thermal spray. The resulting coatings may be lower in porosity compared to coatings made from powders with internal porosity such as agglomerated powders, agglomerated-and-sintered powders, and HOSP.

Figure 6:
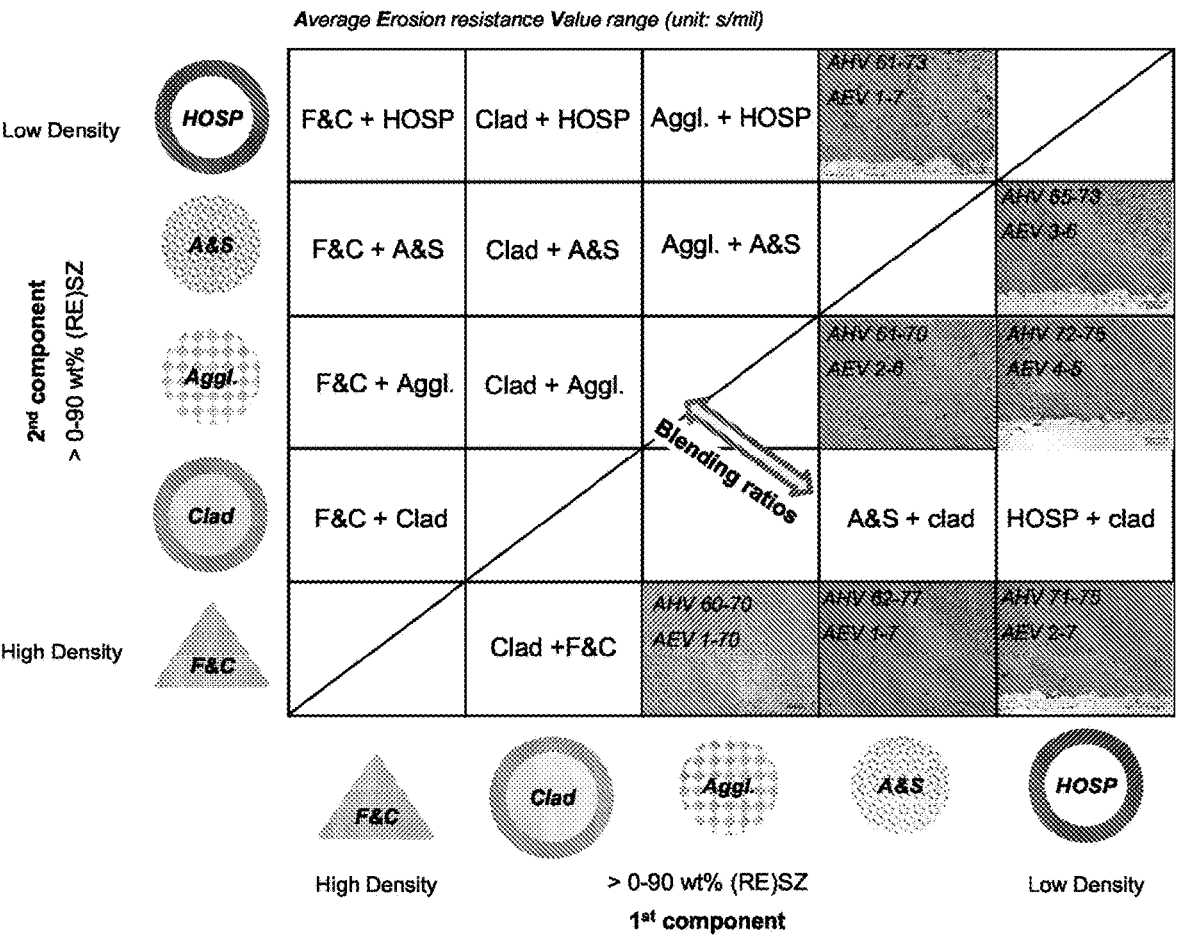
FIG. 6 illustrates selective microstructures and mechanical properties of as-sprayed coatings, according to various example embodiments.

FIG. 6 illustrates selective microstructures and mechanical properties of as-sprayed coatings, according to various example embodiments. FIG. 6 illustrates various combinations of a first component and a second component from any one of the following five types of powder morphologies described: HOSP, A&S particles, agglomerated particles, chemically or physically cladded and F&C particles. Moreover, FIG. 6 shows exemplary blending ratios, as well as exemplary average hardness value ranges (AHV) (unit: HR 15N) and exemplary average erosion resistance value ranges (AEV) (unit: s/mil).

As shown in FIG. 6, the first component can be a >0-90 wt % (RE)SZ and the second component can also be >0-90 wt % (RE)SZ. Moreover, the first component RE oxide can be the same as the second component RE oxide or can be different from the second component RE oxide. It is also noted that the first component can have preferred chemistry ranges of 5-60 (RE)SZ, 15-25 (RE)SZ, 45-55 (RE)SZ or 5-15 (RE)SZ and the second component can have a preferred chemistry ranges of 5-60 (RE)SZ, 15-25 (RE)SZ, 45-55 (RE)SZ or 5-15 (RE)SZ, where the chemistries of the first and second components are the same or different. Example RE oxides and/or chemistries of the first and second components are shown in exemplary Table 3.

TABLE 3

| Coat- | Component 1 | | | Component 2 | | |
|---|---|---|---|---|---|---|
| ing No | Morph- ology | Chemistry range | wt. % | Morph- ology | Chemistry range | wt. % |
| 1 | Agglomer. | 15-25YSZ | 70-90 | F&C | 45-55YSZ | 10-30 |
| 2 | A&S | 45-55YSZ | 50-70 | F&C | 45-55YSZ | 30-50 |
| 3 | A&S | 5-15YSZ | 70-90 | Agglomer. | 50-60YbZrO | 10-30 |
| 4 | A&S | 5-15YSZ | 70-90 | HOSP | 50-60YbZrO | 10-30 |
| 5 | HOSP | 5-15YSZ | 70-90 | F&C | 5-15YSZ | 10-30 |
| 6 | HOSP | 5-15YSZ | 50-70 | Agglomer. | 5-15YSZ | 30-50 |
| 7 | HOSP | 5-15YSZ | 70-90 | A&S | 5-15YSZ | 10-30 |
| 8 | A&S | 50-60YbZrO | 50-60 | A&S | 5-15YSZ | 40-50 |
| 9 | A&S | 50-60YbZrO | 50-60 | A&S | 45-55YSZ | 40-50 |
| 10 | A&S | 5-15YSZ | 50-60 | A&S | 5-15DyZrO | 40-50 |
| 11 | A&S | 15-25YSZ | 50-60 | A&S | 5-15DyZrO | 40-50 |
| 12 | A&S | 45-55YSZ | 50-60 | A&S | 5-15DyZrO | 40-50 |
| 13 | A&S | 50-60YbZrO | 50-60 | F&C | 5-15YSZ | 40-50 |
| 14 | A&S | 5-15YSZ | 50-60 | HOSP | 5-15YSZ | 40-50 |
| 15 | A&S | 45-55YSZ | 50-60 | HOSP | 50-60YbZrO | 40-50 |
| 16 | A&S | 50-60YbZrO | 50-60 | HOSP | 5-15YSZ | 40-50 |
| 17 | A&S | 50-60YbZrO | 50-60 | HOSP | 50-60YbZrO | 40-50 |
| 18 | A&S | 5-15YSZ | 50-70 | F&C | 5-15YSZ | 30-50 |
| 19 | A&S | 45-55YSZ | 50-70 | F&C | 5-15YSZ | 30-50 |
| 20 | A&S | 5-15YSZ | 50-70 | F&C | 5-15YSZ | 30-50 |
| 21 | A&S | 45-55YSZ | 60-80 | F&C | 45-55YSZ | 20-40 |
| 22 | A&S | 5-15YSZ | 70-80 | A&S | 5-15DyZrO | 20-30 |
| 23 | A&S | 15-25YSZ | 70-80 | A&S | 5-15DyZrO | 20-30 |
| 24 | A&S | 45-55YSZ | 70-80 | A&S | 5-15DyZrO | 20-30 |
| 25 | A&S | 5-15YSZ | 70-90 | A&S | 5-15DyZrO | 10-30 |
| 26 | A&S | 5-15YSZ | 70-90 | Agglomer. | 5-15YSZ | 10-30 |
| 27 | A&S | 5-15YSZ | 50-70 | Agglomer. | 5-15YSZ | 30-50 |
| 28 | A&S | 5-15YSZ | 70-90 | Agglomer. | 15-25YSZ | 10-30 |
| 29 | A&S | 5-15YSZ | 70-90 | F&C | Y2O3 | 10-30 |
| 30 | A&S | 5-15YSZ | 70-90 | F&C | 5-15YSZ | 10-30 |
| 31 | A&S | 45-55YSZ | 70-90 | F&C | 5-15YSZ | 10-30 |
| 32 | A&S | 45-55YSZ | 70-90 | F&C | 15-25YSZ | 10-30 |
| 33 | A&S | 45-55YSZ | 70-90 | F&C | 45-55YSZ | 10-30 |
| 34 | A&S | 5-15YSZ | 70-90 | HOSP | 5-15YSZ | 10-30 |
| 35 | A&S | 45-55YSZ | 70-90 | F&C | 45-55YSZ | 10-30 |
| 36 | A&S | 5-15YSZ | 70-90 | A&S | 45-55YSZ | 10-30 |
| 37 | HOSP | 5-15YSZ | 50-70 | F&C | 5-15YSZ | 30-50 |
| 38 | HOSP | 5-15YSZ | 70-90 | Agglomer. | 5-15YSZ | 10-30 |
| 39 | HOSP | 45-55YSZ | 70-90 | F&C | 5-15YSZ | 10-30 |

While Table 3 shows a number of chemistry ranges according to the RE oxide used, this exemplary listing is certainly not exhaustive so as to include all possible combinations for the various RE oxides and/or chemistries of the first and second components according to the embodiments.

In example embodiments, there are several example methods by which the material may be applied to the substrate. In one example embodiment, the powder feedstock may consist of two or more components which are thermally sprayed onto a substrate such as an engine shroud or blade. In an alternative embodiment, the powder feedstock consisting of two or more components can be co-sprayed, i.e., applied at the same time, onto a substrate such as an engine shroud or blade. During the "co-spraying" process, two powder components are separately applied at the same time.

By way of non-limiting example, the above-mentioned powders are produced from multiple components having different morphologies, size ranges and compositions. The abradable powders listed above are deposited, e.g., on a layer of AMDRY 995C or AMDRY 962 bond coat on top of HASTELLOY X as the substrate. All bond coats are preferably between 100 µm and 200 µm in thickness and the coatings are sprayed to a total coating thickness up to 2.0 mm. For each powder type, coupons are prepared for hardness, metallography, erosion testing, and abradability in the as-sprayed condition and after exposure to 1000° C. for 24 hours in atmosphere. The different tests conducted on the coatings as comparison to commercially available coating products show that such experimental powder compositions allow to produce coatings with properties that are substantially improved over that of benchmarked legacy products. Hardness and erosion resistance can be tailored to the desired window of operation in the as-sprayed condition and the influence of sintering was eliminated.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method of making a thermal spray powder, the method comprising:

combining two or more component powders to form a composite powder, wherein each of the two or more component powders have different morphologies;

wherein each of the two or more component powders consist of rare earth stabilized zirconia in an amount of from greater than 0 weight percent to 90 weight percent;

an oxide selected from the group consisting of aluminum oxide, barium strontium aluminosilicate, calcium oxide, hafnium oxide, high entropy oxide, magnesium oxide, mullite, and silicon oxide, and a rare-earth oxide selected from the group consisting of Ce, Dy, Er, Eu, Gd, Hf, Ho, La, Nd, Lu, Pm, Pr, Sc, Sm, Tb, Tm, Y, Yb, and mixtures thereof;

wherein the high entropy oxide comprises a matrix having at least three principal elements each constituting between 5 weight percent and 35 weight percent of the matrix;

wherein at least one of the two or more component powders has a particle size range of from about 10 μm to about 180 μm; and wherein at least two of the two or more component powders are produced via different manufacturing process selected from the group consisting of agglomeration, agglomeration-and-sintering, fused-and-crushed, chemical cladding, physical cladding, and hollow oxide spherical powder (HOSP).

2. The method of claim 1, wherein the composite powder comprises a material selected from the group consisting of at least one principal component and a combination of one or more secondary components.

3. The method of claim 2, wherein the primary component is a matrix former.

4. The method of claim 2, wherein one of the one or more secondary components is a porosity former.

5. The method of claim 2, wherein one of the one or more secondary components is a structure hardener.

6. The method of claim 1, wherein the thermal spray powder is suitable for use in a thermal spray process selected from the group consisting of air plasma spraying, high velocity oxyfuel or combustion spraying.

7. The method of claim 6, wherein the thermal spray powder is suitable for use in a thermal spray process that provides a thermal-sprayed coating having a thickness of from about 5 μm to about 8,000 μm.

8. The method of claim 1, wherein the composite powder excludes a polymeric binder.

9. The method of claim 1, wherein each of the two or more component powders have at least one of i) different compositional ratios; or ii) different particle size ranges relative to other component powders.

10. The method of claim 1, wherein the rare earth stabilized zirconia of at least one of the components is present in an amount of from 5 weight percent to 60 weight percent.

11. The method of claim 10, wherein the rare earth stabilized zirconia of at least one of the components is present in an amount of from 15 weight percent to 25 weight percent.

12. The method of claim 10, wherein the rare earth stabilized zirconia of at least one of the components is present in an amount of from 45 weight percent to 55 weight percent.

13. The method of claim 10, wherein the rare earth stabilized zirconia of at least one of the components is present in an amount of from 5 weight percent to 15 weight percent.

14. The method of claim 1, wherein the rare-earth oxide is selected from an oxide of yttrium or ytterbium.

15. The method of claim 14, wherein the rare-earth oxide is a yttrium-stabilized zirconia.

16. A method of making a thermal spray powder, the method comprising:

combining two or more component powders to form a composite powder;

wherein each of the two or more component powders have different morphologies;

wherein each of the two or more component powders consist of an oxide selected from the group consisting of aluminum oxide, barium strontium aluminosilicate, calcium oxide, hafnium oxide, high entropy oxide, magnesium oxide, mullite, silicon oxide, and zirconium oxide, and a rare-earth oxide selected from the group consisting of Ce, Dy, Er, Eu, Gd, Hf, Ho, La, Nd, Lu, Pm, Pr, Sc, Sm, Tb, Tm, Y, Yb, and mixtures thereof;

wherein the high entropy oxide comprises a matrix having at least three principal elements each constituting between 5 weight percent and 35 weight percent of the matrix;

wherein at least one of the two or more component powders has a particle size range of from about 10 μm to about 180 μm; and wherein at least two of the two or more component powders are produced via different manufacturing process selected from the group consisting of agglomeration, agglomeration-and-sintering, fused-and-crushed, chemical cladding, physical cladding, and hollow oxide spherical powder (HOSP).

17. A method of forming an abradable coating layer, the method comprising:

thermal spraying or co-spraying the composite powder of claim 1 to form the abradable coating layer on a substrate, wherein the thermal spraying or co-spraying is done at a temperature sufficient to partially melt particles of the powder feedstock during spraying; and cooling the abradable coating layer to room temperature wherein the abradable coating layer is substantially free of any cracks.

18. The method of claim 17, wherein the thermal spraying comprises at least one selected from the group consisting of air plasma spraying, high velocity oxyfuel and combustion spraying.

19. The method of claim 17, wherein the component powders have different particle size ranges or different chemical compositions.

20. The method of claim 17, wherein the abradable coating layer has a thickness of from about 5 μm to about 8,000 μm.

21. The method of claim 20, wherein the thermal-sprayed coating comprises a porosity of from about 1% to about 90% as determined by at least one of the following measurement techniques: apparent density measurement (ASTM B212 or ASTM B329), tap density measurement (ASTM B527), or BET surface area measurement (ASTM D3663 or ISO 9277).

\* \* \* \* \*